W. Z. HAIGHT.
TRUCK.
APPLICATION FILED JULY 21, 1910.
1,006,083.
Patented Oct. 17, 1911.
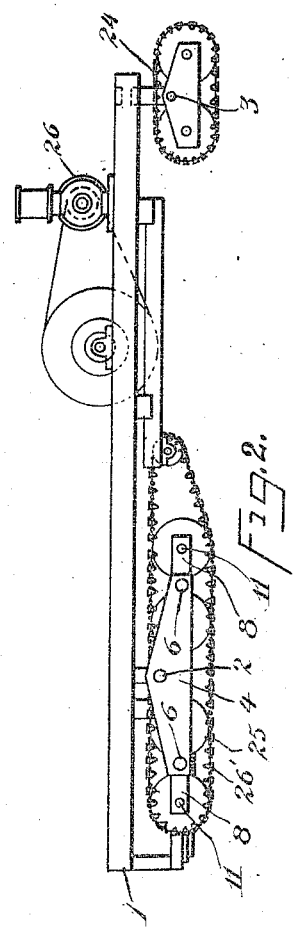
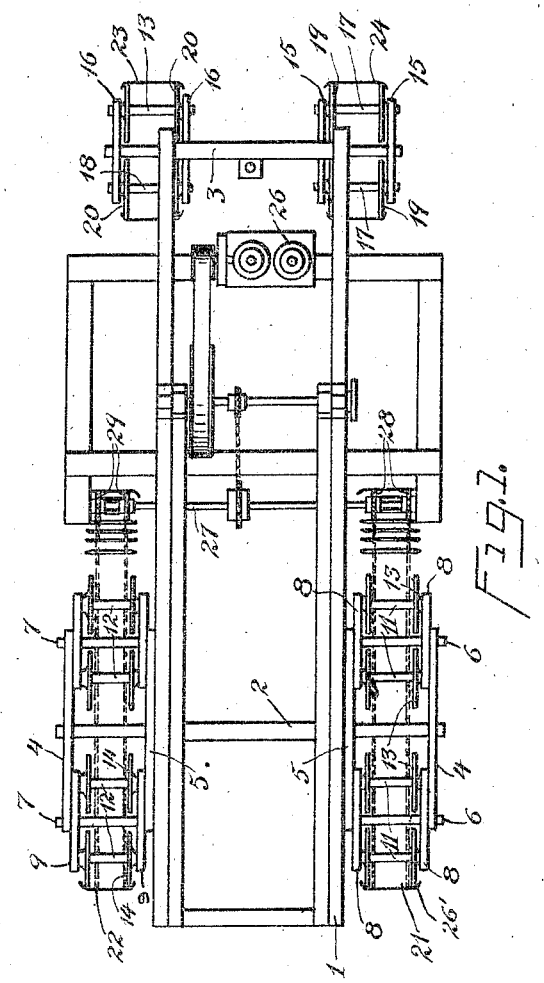
WITNESSES:
H. S. Barker
A. Tompkins
INVENTOR
Washington Z. Haight
BY
Hardway & Cathey
ATTORNEY

UNITED STATES PATENT OFFICE.

WASHINGTON Z. HAIGHT, OF HOUSTON, TEXAS.

TRUCK.

1,006,083.

Specification of Letters Patent.

Patented Oct. 17, 1911.

Application filed July 21, 1910. Serial No. 573,087.

*To all whom it may concern:*

Be it known that I, WASHINGTON Z. HAIGHT, a citizen of the United States, residing at Houston, in the county of Harris and State of Texas, have invented certain new and useful Improvements in Trucks, of which the following is a specification.

My invention relates to new and useful improvements in trucks.

The object of the invention is to provide a device of the character described including a bed frame supported upon a set of ground wheels or spools in such a manner that the shock imparted to said bed frame by reason of the irregularity of the surface over which the machine passes will be minimized.

Another object of the invention resides in the provision of endless aprons upon which the supporting spools may travel, and which are designed to give a greater bearing surface for the traction mechanism. These aprons are further provided with engaging shoulders designed to engage with the ground surface and prevent the slipping of the aprons in case of heavy draft.

With the above and other objects in view my invention has particular relation to certain novel features of construction and operation an example of which is given in this specification and illustrated in the accompanying drawings, wherein:—

Figure 1 is a plan view of my device, and Fig. 2 is a side elevation thereof.

Referring now more particularly to the drawings the numeral 1 refers to a bed frame which is composed of suitable side and end members and is constructed in a manner best designed to accomplish the desired results. This frame merely serves as a base for the support and connection of the various other parts. This frame is supported upon a main rear axle 2 and a front axle 3. The rear axle is fixed rigidly to the bed frame and on the ends thereof are the pairs of levers 4 and 5 secured in such a manner as to be free to oscillate on said axle. Through the ends of these levers, respectively, are secondary axles numbered respectively, 6 and 7, mounted upon which are the respective sets of levers 8 and 9, arranged so as to be free to oscillate on their respective axles. The levers 8 and 9 carry by their respective ends tertiary axles 11 and 12 upon which the spools 13 and 14, respectively rotate. Mounted upon each end of the front axles are the pairs of levers 15 and 16 which readily oscillate thereon. The ends of these levers are provided with axles 17 and 18, upon which the front spools 19 and 20 rotate.

The general use of traction machinery is limited by the fact that its movement on soft soil, sand, snow, mud, etc., is greatly impeded by the fact that it sinks into the supporting surface. Its use on irregular ground and in slippery places is also limited because of the slipping of its driving wheels. In this truck these obstacles have been overcome by greatly increasing the bearing surface of the driving and carrying wheels, which is accomplished by means of the endless belts or aprons 21, 22, 23 and 24 which pass around their respective spools, as shown in the drawing. These aprons greatly increase the bearing surface of the traction mechanism and provide smooth paths on which the traction wheels 13 and 14 and the supporting wheels 19 and 20 may run. The aprons referred to by the numerals 21 and 22, consist of two sprocket chains carrying a plurality of cleats or bars, 25. The numeral 26 refers to a suitable motor operatively connected with a drive shaft 27 carrying on each end rigidly mounted sprocket wheels 28 and 29. The two chains of the respective traction apron run parallel to each other and mesh with their respective wheels 28 and 29 and are driven thereby, and the cleats or bars, 25 are riveted or bolted to said chains and extend beyond the outer sides thereof. The chains run between the spool flanges and an endless apron is thus formed the under side of which contacts with the ground and the spools 13 and 14 roll over it easily without sinking in. The top side of the apron operates as a drive chain and pulls the spools, with their load, forward.

All of the spools on each side of the machine run in the same path, that is each directly behind the one ahead. As the first spool passes over the apron it presses its cleats 25 firmly down upon the road to be traversed, thus smoothing down any irregularities. Each following spool then has a smooth level path on which to move. One end of each cleat is turned upward toward the axle of the spools, as at 26'. These turned up ends are alternately placed on the outside and inside edges of the apron and serve the purpose of keeping the spools from running off the aprons. The spools and apron of the front trucks are substantially similar to those of the traction truck but differ in that the aprons of the front spools are not provided with driving sprockets since they exert no driving influence upon their spools but merely serve as paths upon which said spools travel. The cleats or bars of the aprons are located some considerable distance apart and their rear edges are so shaped that they will readily engage with the ground in moving and thus any slippage of the aprons will be prevented.

The traction aprons 21 and 22 lie upon the ground and conform to the irregularity thereof and the spools are free to move upon their respective apron and with four pairs of traction spools, as is used in this particular machine shown, any obstacle encountered by either of said spools singly, will operate to raise the machine only a very small fraction of the height of the obstacle, owing to the free oscillating movement of the levers supporting said spool upon the supporting axles of said levers.

A machine of the character described constructed in accordance with the foregoing specification and drawings accompanying the same will be found to move readily over any character of surface irrespective of its nature or irregularity, with comparative ease and smoothness and will not be so susceptible to sink into said surface or to be shocked by its movement thereover, as machines of a similar character now in common use.

What I claim is:—

1. A device of the character described including a supporting frame mounted upon suitable supporting axles, a plurality of pairs of oscillating levers carried by one of said axles, each pair of said oscillating levers carrying at its extremity a pair of levers so connected thereto as to be capable of oscillating, rotatable flanged spools carried by the last mentioned levers, endless belts or aprons passing around said spools, upturned portions carried by said aprons adapted to act as guideways for the said spools, a motive mechanism carried by said frame and operatively connected with said aprons in such a manner as to impart rotation thereto, a pair of oscillating levers carried by each of the other axles and a plurality of rotatable spools carried by said levers for supporting said frame.

2. A device of the character described including a supporting frame mounted upon suitable supporting axles; a plurality of pairs of oscillating levers carried by one of said axles, each pair of oscillating levers carrying at its extremity a pair of levers so connected thereto as to be capable of oscillating; rotatable flanged spools carried by the last mentioned levers; endless belts or aprons passing around said spools; upturned portions carried by the free edges of said aprons adapted to act as guideways for the said spools; a motive mechanism carried by said frame and operatively connected with said apron in such a manner as to impart rotative motion thereto; a pair of oscillating levers carried by each of the other axles and a plurality of spools carried by said levers for supporting said frame substantially as described and for the purpose specified.

In testimony whereof I have signed my name to this specification in the presence of two subscribing witnesses.

WASHINGTON Z. HAIGHT.

Witnesses:
J. W. YEAGLEY,
H. S. BARKER.